UNITED STATES PATENT OFFICE.

LEWIS CHEESEMAN, OF GLENBURN, PENNSYLVANIA, ASSIGNOR TO WITHERBEE, SHERMAN & CO., OF PORT HENRY, NEW YORK, A CORPORATION OF NEW YORK.

PROCESS OF SWEETENING AND FERTILIZING THE SOIL.

1,076,818.  Specification of Letters Patent.  Patented Oct. 28, 1913.

No Drawing.  Application filed October 25, 1911.  Serial No. 656,706.

*To all whom it may concern:*

Be it known that I, LEWIS CHEESEMAN, citizen of the United States, residing at Glenburn, in the county of Lackawanna and State of Pennsylvania, have invented certain new and useful Improvements in Processes for Sweetening and Fertilizing the Soil; and I do hereby declare the following to be a full, clear, and exact description of the invention, such as will enable others skilled in the art to which it appertains to make and use the same.

My invention consists of a new and useful process for sweetening the soil, by removing acid conditions therefrom, and for indirect fertilization.

When commercial fertilizers are used, the result is an acid condition of the soil, as for example, when sulfate of potash gives up the basic radical $K_2O$ the acid radical $SO_3$ remains. When nitrate of soda is used in the soil, the excess of nitric acid not absorbed by the growing plants must be fixed by a stronger base than soda, so when available phosphates are manufactured by the addition of sulfuric acid to phosphate of lime, an excess of sulfuric acid is employed to give the maximum percentage of available phosphoric acid, and this sulfuric acid must be neutralized.

Acid conditions have heretofore been neutralized by the alkaline earth base, lime, as oxid, hydroxid or carbonate, while I accomplish this result in a shorter period of time and in a more positive manner by my process, which consists in using the alkaline earth base, barium, preferably as hydrate, or as hydrate and sulf-hydrate.

When I use hydrate and sulf-hydrate, I form the double molecule from barium sulfide, with the moisture in the soil according to the reaction;

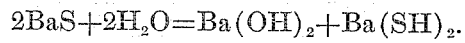

$$2BaS + 2H_2O = Ba(OH)_2 + Ba(SH)_2.$$

When using barium sulfid I prefer to add sufficient oxid of lime or oxid of lime and water (as hydrate) to gradually convert the barium sulf-hydrate, formed by the moisture in the soil, into barium hydrate according to the reaction.

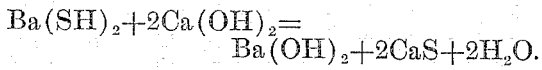

$$Ba(SH)_2 + 2Ca(OH)_2 = Ba(OH)_2 + 2CaS + 2H_2O.$$

I find that when barium hydrate or barium hydrate and sulf-hydrate mixed with hydrate of lime, or its equivalent, oxid of lime, are added to the soil, all acid bodies tend to combine with the barium base, which base is probably the most powerful known to inorganic chemistry, forming in many cases, salts insoluble in water.

When barium hydrate or barium hydrate and barium sulf-hydrate mixed with oxid of lime, or oxid of lime with sufficient water to form hydrate of lime, are added to finely ground phosphate of lime, the phosphorus is readily used by the growing plant, as is the case when the well known substance called Thomas slag is employed. This slag material is effective in proportion to its alkalinity due to caustic lime, hydrate of lime or carbonate of lime, or a mixture of any two or in some instances all three, depending on the length of time elapsing from the time of manufacture to time of use.

In carrying out my process, for example, by the use of barium sulfid and calcium hydrate I find it advantageous to use substantially the proportions of three hundred and thirty-eight (338) pounds of barium sulfid with one hundred and forty-eight (148) pounds of calcium hydrate, while in using barium sulfid and calcium oxid, the proportions are substantially three hundred and thirty-eight (338) pounds of barium sulfid and one hundred and twelve (112) pounds of calcium oxid. These proportionate mixtures have given the most advantageous effect of barium hydrate in the soil.

In carrying out my process when barium sulfid and lime are used alone, the direct result is to correct acidity in the soil, but the indirect result is to allow the plant to use the phosphoric acid, potash and nitrogen in the soil, thus providing for indirect fertilization, so that by my use of barium compounds, I obtain action in this regard which is indirect, but none the less effective for fertilization.

It is a fact that when acid effects are removed from the soil, including excess of nitrates, and the soil is kept alkaline, nitrification proceeds, and under this condition, both the nitrogen of the air and the nitrogen compounds in the soil, are drawn upon to sustain and nourish plant life.

When natural manures, such as come from the domestic animals are used as fertilizers, the materials involved in applying my process are equally effective since acid effects due to fermentive action in the warm moist soil, are corrected, as these salts will quickly and permanently neutralize all acid conditions in the soil, which are generally agreed to be harmful to vegetation; and these salts may be used at all seasons of the year and in connection with any and all materials used for manurial purposes.

What I claim and desire to secure by Letters Patent is:—

1. The process of sweetening and fertilizing the soil, which consists in applying thereto a composition having a base containing sulfid of barium, as its principal ingredient.

2. The process of sweetening and fertilizing the soil, which consists in using therewith barium hydrate.

3. The process of sweetening and fertilizing the soil, which consists in using therewith the alkaline earth base barium as hydrate and sulf-hydrate.

4. The process of sweetening and fertilizing the soil, which consists in applying thereto a composition comprising among its component parts barium sulfid and oxid of lime.

In testimony whereof I affix my signature, in the presence of two witnesses.

LEWIS CHEESEMAN.

Witnesses:
HANNAH ECKERSBY,
MORTON W. STEPHENS.